(12) United States Patent
Nakane et al.

(10) Patent No.: US 6,493,303 B2
(45) Date of Patent: Dec. 10, 2002

(54) OPTICAL DISK, AN OPTICAL DISK DEVICE, AND A METHOD OF MANAGING DEFECTS IN AN OPTICAL DISK

(75) Inventors: Kazuhiko Nakane, Tokyo (JP); Hiroyuki Ohata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,323

(22) Filed: Nov. 19, 2001

(65) Prior Publication Data

US 2002/0027852 A1 Mar. 7, 2002

Related U.S. Application Data

(62) Division of application No. 09/368,359, filed on Aug. 5, 1999.

(30) Foreign Application Priority Data

Aug. 5, 1998 (JP) ............................................ 10-222003

(51) Int. Cl.[7] ................................................. G11B 7/00
(52) U.S. Cl. ............................ 369/53.17; 369/47.14; 369/53.15
(58) Field of Search ........................... 369/47.1, 47.14, 369/47.17, 53.1, 53.12, 53.15, 53.17, 53.31, 53.42, 59.1, 59.25

(56) References Cited

U.S. PATENT DOCUMENTS

| | | |
|---|---|---|
| 4,984,230 A | 1/1991 | Satch et al. |
| 5,220,569 A | 6/1993 | Hartness |
| 5,235,585 A | 8/1993 | Bish et al. |
| 5,237,553 A | 8/1993 | Fukushima et al. |
| 5,404,357 A * | 4/1995 | Ito et al. .................. 369/44.27 |
| 5,677,899 A | 10/1997 | Getreuer |
| 6,160,778 A * | 12/2000 | Ito et al. .................. 369/275.3 |

FOREIGN PATENT DOCUMENTS

| | | |
|---|---|---|
| EP | 0642128 A1 | 3/1995 |
| EP | 0822555 A2 | 2/1998 |
| EP | 0952573 A2 | 4/1999 |
| JP | 63A-14379 | 1/1999 |
| JP | 11 144381 | 5/1999 |
| WO | WO 9417524 | 4/1994 |

OTHER PUBLICATIONS

G. Bouwhuis et al., Philips Research Laboratories, Eindoven, Oct. 31, 1985; pp. 248–265.

* cited by examiner

Primary Examiner—Muhammad Edun
(74) Attorney, Agent, or Firm—Birch, Stewart, Kolasch & Birch, LLP

(57) ABSTRACT

When optical disk defects are managed by using non-defective areas in place of defective areas, different criteria are used for detecting the defects, depending on the type of data recorded on the disk. For example, to avoid interruptions of real-time recording, less strict criteria are used when audio or video data is recorded than when computer data is recorded. The criteria themselves may also be recorded on the disk.

4 Claims, 12 Drawing Sheets

| STEP | HOST | INTERFACE | DRIVE |
|---|---|---|---|
| 1 | DETERMINE APPROPRIATE CRITERIA | | |
| 2 | PREPARE DATA | | |
| 3 | SEND COMBINED CRITERIA SETTING AND WRITE COMMAND | TRANSFER COMMAND AND DATA (HOST→DRIVE) | RECEIVE COMMAND AND DATA |
| 4 | | | STORE CRITERIA |
| 5 | | | RECORD DATA ON OPTICAL DISK |
| 6 | RECEIVE RESULT SIGNAL | TRANSFER RESULT SIGNAL (DRIVE→HOST) | SEND RESULT SIGNAL |
| 7 | TAKE APPROPRIATE ACTION | | |

FIG.6

| TYPE | CRITERIA A | CRITERIA B |
|---|---|---|
| SERVO DEFECT | TRACKING ERROR $\geq$ Wt/8 | TRACKING ERROR $\geq$ Wt/4 |
| HEADER DEFECT | AT LEAST 1 SECTOR WITH 3 OR MORE ERRONEOUS HEADERS | AT LEAST 2 SECTORS WITH 4 ERRONEOUS HEADERS EACH |
| DATA DEFECT | AT LEAST 8 ROWS WITH AT LEAST 4 ERRONEOUS BYTES EACH | AT LEAST 8 ROWS WITH AT LEAST 8 ERRONEOUS BYTES EACH |

FIG.7

| TYPE | CRITERIA A | CRITERIA C | CRITERIA B |
|---|---|---|---|
| SERVO DEFECT | TRACKING ERROR $\geq$ Wt/8 | TRACKING ERROR $\geq$ Wt/6 | TRACKING ERROR $\geq$ Wt/4 |
| HEADER DEFECT | AT LEAST 1 SECTOR WITH 3 OR MORE ERRONEOUS HEADERS | AT LEAST 1 SECTOR WITH 4 ERRONEOUS HEADERS | AT LEAST 2 SECTORS WITH 4 ERRONEOUS HEADERS |
| DATA DEFECT | AT LEAST 8 ROWS WITH AT LEAST 4 ERRONEOUS BYTES EACH | AT LEAST 8 ROWS WITH AT LEAST 4 ERRONEOUS BYTES EACH | AT LEAST 8 ROWS WITH AT LEAST 8 ERRONEOUS BYTES EACH |

FIG.9

| STEP | HOST | INTERFACE | DRIVE |
|---|---|---|---|
| 1 | DETERMINE APPROPRIATE CRITERIA | | |
| 2 | SEND CRITERIA SETTING COMMAND | TRANSFER COMMAND (HOST→DRIVE) | RECEIVE CRITERIA SETTING COMMAND |
| 3 | | | STORE CRITERIA |
| 4 | PREPARE DATA | | |
| 5 | SEND WRITE COMMAND | TRANSFER COMMAND AND DATA (HOST→DRIVE) | RECEIVE COMMAND AND DATA |
| 6 | | | RECORD DATA ON OPTICAL DISK |
| 7 | RECEIVE RESULT SIGNAL | TRANSFER RESULT SIGNAL (DRIVE→HOST) | SEND RESULT SIGNAL |
| 8 | TAKE APPROPRIATE ACTION | | |

FIG.10

| STEP | HOST | INTERFACE | DRIVE |
|---|---|---|---|
| 1 | DETERMINE APPROPRIATE CRITERIA | | |
| 2 | PREPARE DATA | | |
| 3 | SEND COMBINED CRITERIA SETTING AND WRITE COMMAND | TRANSFER COMMAND AND DATA (HOST→DRIVE) | RECEIVE COMMAND AND DATA |
| 4 | | | STORE CRITERIA |
| 5 | | | RECORD DATA ON OPTICAL DISK |
| 6 | RECEIVE RESULT SIGNAL | TRANSFER RESULT SIGNAL (DRIVE→HOST) | SEND RESULT SIGNAL |
| 7 | TAKE APPROPRIATE ACTION | | |

OPTICAL DISK, AN OPTICAL DISK DEVICE, AND A METHOD OF MANAGING DEFECTS IN AN OPTICAL DISK

This application is a divisional of co-pending application Ser. No. 09/368,359, filed on Aug. 5, 1999, the entire contents of which are hereby incorporated by reference and for which priority is claimed under 35 U.S.C. §120; and this application claims priority of Application No. 222003/98 filed in Japan on Aug. 5, 1998 under 35 U.S.C. §119.

BACKGROUND OF THE INVENTION

The present invention relates to a method of managing defects in a disk recording medium, an optical disk device recording data on the optical disk using such a defect management method, and an optical disk capable of storing information concerning a defect criteria used for replacing a defective area of disk with a non-defective area.

A very high degree of reliability less than $10^{-12}$ at worst is required of a disk used for recording computer data. Defect-managing systems have been used hitherto to accommodate the reality that defects in recording sectors which lead to an error are unavoidable, even very rare, in the current disk-manufacturing technique.

Disk mediums are subjected to the defect management for assuring data reliability even when dirt, scratches or degradation due to repetition of rewriting operation is caused. Primary defects occurring at the time of manufacture of the disks are found through a certifying process carried out at the time of initializing disks, and secondary defects occurring after being put to use are found through verification carried out at the time of writing, or the like. Sectors found to have a defect are replaced, using sectors located in a spare area formed on part of a disk other than a user area. In the defect management, a pair of a user area and a spare area is called a group.

In an example of arrangement of user areas and spare areas on a disk, the data area consists of a single group. However, there are many optical disks in which a data area is divided into a plurality of groups. When a defective group is found in a group, it is first attempted to replace the defective sectors using sectors in a spare area of the same group. In many cases, an optical disk is configured such that a recording capacity of a spare area is several % of that of a user area. The 90 mm magneto-optic disk standard defined by ECMA-154 or ECMA-201, and the DVD-RAM standard defined by ECMA-272 are examples of such configuration.

Incidentally ECMA is an abbreviation of European Computer Manufacturers Association, DVD is an abbreviation of digital video disk, and RAM is an abbreviation of random-access memory.

The presence or absence of a defect in a sector can be determined by an error in an ID signal representing a physical address of the sector, an error in a recorded data signal, or a servo error signal.

When a plurality of ID's are recorded in the header area for each sector, if not less than a predetermined number of ID's for each sector contain an error, the sector in question is found to have a header defect. In the DVD-RAM standard for example, each sector is provided with four ID's, and an error can be detected for each ID. Each sector is found not to have a header defect if it has not more than two ID errors: a sector having three or more ID errors is found to have a header defect, since its reliability is low.

Further, the presence or absence of an error in a recorded data signal is detected by the use of an error correcting code added thereto. When more than a predetermined number of errors are included per unit of recording, the data signal is found to have a data defect. The "unit of recording" may be a sector or a block constituted of a plurality of sectors depending on the span of an error correcting code (ECC).

In the DVD-RAM standard, data is recorded in sectors on a disk, and is subjected to error-correcting coding in units of 16 sectors, called an ECC block. Data of 32 KB constituting one ECC block is arranged in the form of matrix of 172×192 bytes (or 172 columns×192 rows), and Reed-Solomon codes (inner code PI, outer code PO) of 10 bytes and 16 bytes are added in column direction and row direction, respectively, to constitute a product code.

The inner code PI is disposed so as to be completely within a sector. By means of the inner code PI, the number of error bytes in each row of the reproduced data can be determined. In accordance with the detected number of errors, reliability of each row is evaluated, and whether each sector or each block has a data defect can be determined based on the number. For instance, a sector including four or more rows having four or more error bytes is found to have a data defect, or a block including six or more such rows are found to have a data defect.

With regard to detection of defects based on a servo error signal, when the magnitude of the servo error signal such as a tracking error signal exceeds a predetermined value that makes it difficult to ensure the servo control stability required of data recording, a sector in question is found to have a servo defect.

When a sector is found to have a header defect, a data defect or a servo defect, it is found to be defective.

Generally, in the defect management, two different methods are used for performing replacement of a sector. One is a slip replacement, and the other is a linear replacement.

The slip replacement is applied to primary defects. If a defective sector is found at the time of certifying a disk, the next sector is used in place of the defective sector. In a disk drive device, for accessing a sector containing data, a logical address is converted into a physical address representing the position of the sector, and a sector having ID's representing the physical address is accessed. When the slip replacement has been performed, the physical address numbers corresponding to the logical addresses are shifted, or "slip" by one.

The slip replacement is carried out within each group. For instance, if there occur two slip replacements of m sectors and n sectors in a user area, the end of the user area of the group is shifted into the head of the spare area by (m+n) sectors. If such slip replacements are made, the linking relation between the physical addresses and logical addresses is shifted by the number of replaced sectors for all the sectors succeeding the replaced sectors. Primary defects subjected to the slip replacement are registered in a PDL (Primary Defect List). The list contains the physical addresses of defective sectors in each entry.

Linking the physical addresses with the logical addresses can be made only when a disk is initialized, and therefore, the slip replacement is applied to primary defects only.

The linear replacement is applied to secondary defects. When a defective sector is found, replacement is effected using spare sectors in a spare area. When an ECC block (formed of 16 sectors) is found to contain a defective sector, the entire ECC block is replaced with 16 sectors in a spare area. There may be a case where a block in a spare area having replaced another block is subsequently replaced with another block. A substitutive sectors are given the same logical addresses as the original sectors.

The linear replacement is effected within the same group first. For instance, when two linear replacements of m blocks and n blocks respectively occur in a user area, m blocks and n blocks at the beginning of the unused part of the spare area are used. It may be so designed that when the spare area of the same group has been used up the spare area in another group is used. Secondary defects subjected to linear replacement are registered in an SDL (Secondary Defect List). The list contains physical addresses of defective sectors and substitutive sectors in each entry.

When such a linear replacement has been made, every time an access is made using a logical address which designated a substitutive sector, an access to the substitutive sector and subsequent return have to be made. Therefore, the average data transfer rate is substantially lowered when the secondary defects exist.

A set of the defect lists PDL and SDL is stored in a defect management area within a control information area in each of outer and inner periphery parts. They are disposed at a plurality of locations, and they are recorded together with information on the structure of a disk.

Generally, in recording devices, criteria for detecting primary and secondary defects are set in the following way.

A disk is at its best condition when primary defects are detected and registered. The number of defects on the disk increases with time or usage due to scratches and dirt, and resultant degradation. Therefore, the primary defects are detected and replacement is effected by using a criteria which is more strict than that for detecting the secondary defects, so that some additional scratches or dirt will not results in the finding of a defect according to the criteria for detecting the secondary defects.

Although the secondary defects are detected with a criteria which is less strict than that for the primary defects, a margin of safety is left between the criteria for detecting the secondary defects and the error-correcting capability, so as to ensure error correction during reproduction. In this way, different criteria are used for the primary defect detection and the secondary defect detection.

Conventionally, optical disks are used mainly for computer date recording, and therefore, the primary concern was to improve the data reliability, and defect management mainly consisting of replacement using spare sectors has been developed to deal with the defects in the recording sectors causing the errors.

In recent years, with increasing capacity of optical disks, their uses are expanding to the video recording field, such as in DVD.

Data files for recording computer data (PC files) are expected to be completely error-free, and high reliability is required of recording. In contrast, data files for recording audio or vide data (AV files) require recording data inputted continuously in real time. In some cases, errors are permissible as long as the disturbance of reproduced images or sounds is not noticed, so that data reliability is not required to be as high as in computer data recording. Instead, non-interruption of recording is important.

That is to say, with regard to storage devices for computer data recording, primary importance is the reliability rather than recording time, while, for storage devices for video recording, primary importance is continuous recording performance. Consequently, in case of using the same type of disk for recording both audio or video data and computer data, it is required to ensure reliability and recording speed which meet the requirements of the respective recordings. Likewise, defect management must be adaptable to both types of recording.

Conventional defect management for optical disks has the following drawbacks.

For carrying out replacement to deal with secondary defects of a disk at the time of recording, data is reproduced from the recorded part for verification, and if errors of more than a prescribed criteria, or a defective part from which reproduction is impossible is found, the data recorded in that part is re-recorded in substitutive sectors in a spare area, and data is again reproduced from the substitutive sectors for verification. Thus, when a secondary defect is detected, and replacement is effected, the time needed is four times more than the time needed for recording data once. In case of recording audio or video data in real time, it is likely that recording is interrupted if a defect is detected.

One solution to this problem is not to detect secondary defects during the recording of audio or video data. In this case, the reproduced image or the like may have disturbances at parts having the secondary defects, but such disturbances are considered less objectionable than interruption of recording. The underlying assumption is that once primary defects have been removed at the time of initialization of the disk, any secondary defects that might occur will be minor. If the scale of the secondary defects is greater than predicted, the disturbance of the reproduced picture may be intolerable, and thus this solution fails.

Where the optical disks are used for recording audio or video data, it is considered unnecessary to detect defects with criteria which is as strict as that used in recording computer data. This is because, if the excessively strict criteria is used, sectors which are permissible for audio or video data are also found defective, and video recording is interrupted when the time-consuming replacement is effected. Because the conventional defect management method does not take into consideration the intended use of the optical disk, and the criteria used is of the same level regardless of the intended use of the optical disk, there was no conception of using the optimum defect detecting method.

SUMMARY OF THE INVENTION

The present invention has been made overcome the above-outlined problem, and its object is to adapt defect management to the type of data recorded on an optical disk, or the intended use of the disk.

Another object is to improve the interchangeability of the optical disk.

A further object is to improve the utility of optical disks for recording audio or video data.

According to a first aspect of the invention, there is provided a method of managing defects on an optical disk used for recording data, including determining a criteria for detecting defects according to the type of data for which defects are to be detected; and detecting defects using said criteria when data is recorded on or reproduced from the disk.

With the above arrangement, it is possible to use the criteria suitable for the particular type of data for which defects are to be detected.

The step of detecting defects may be performed with regard to data recorded on the disk.

In this case the defects may be detected when the data is recorded on the disk, or when the data is reproduced for verification of the data having been recorded. When the defects are detected when the data is recorded, determination of presence or absence of servo defects and header defects can be made, but determination of presence or absence of data defects cannot be made. When the defects are detected during reproduction for verification, presence of absence of data defects as well as servo defects and header defects can be determined.

The step of detecting defects may alternatively be performed when the data is reproduced. In such a case, if defects are detected, the reproduction of the data is re-tried. Decision on whether the reproduction is to be re-tried is made using different criteria depending on the type of data being reproduced.

The method may further comprise the step of using non-defective areas of the optical disk in place of defective areas of the optical disk.

With the above arrangement, the result of the defect detection can be used in making a decision as to whether the areas found to be defective should be replaced with non-defective areas.

The step of determining a criteria may include:

selecting one of the plurality of criteria according to the type of data for which defects are to be detected.

With the above arrangement, the defect criteria can be determined simply by providing a signal which selects one of the plurality of criteria provided in advance, rather than specifying the values forming the criteria.

The plurality of criteria may include at least a first criteria, and a second criteria, the second criteria being less strict than said first criteria, and said step of selecting may include selecting the first criteria when the data for which defects are to be detected is one for which time restriction with regard to data recording or reproduction is less strict, and selecting the second criteria when the data for which defects are to be detected is one for which time restrictions with regard to data recording or reproduction is more strict.

An example of the data for which time restriction with regard to data recording or reproduction is less strict is computer data. An example of the data for which time restriction with regard to data recording or reproduction is more strict is audio or video data.

By using a less strict criteria for the audio or video data, interruption of the audio or video data recording is avoided unless the defect is of such a degree that the resultant disturbance in the sound or picture is intolerable.

The method may further include sending control information for specifying the criteria, from means for processing data to be recorded, to means for recording said data.

The above-mentioned means for processing data to be recorded is for example a host device. The above mentioned means for recording the data is for example a disk device.

With the above configuration, the host device can set criteria which is finely optimized for the type of the data to be recorded on the disk.

The data may be recorded in units of recording, and the step of sending control information may send the control information for each unit of recording.

With the above configuration, it is possible to dynamically set criteria which is finely optimized for each unit of recording (e.g., sector or ECC block), depending on the type of the data to be recorded in each unit of recording. That is, even when different types of data, e.g., audio or video data, and computer data, are both recorded on the same disk, since the host device sends the criteria control information in association with the data to be recorded, and the defect management can be effected using the optimum criteria for the respective data.

The control information specifying the criteria may select one of a plurality of criteria.

With the above configuration, the amount of control information is small, since it only needs to specify one of the plurality of predetermined criteria, rather than specifying values forming the criteria itself.

Data may be recorded in units of recording, and said method may further include recording control information representing the criteria for each unit of recording, on the optical disk, in association with each unit of recording.

With the above configuration, the criteria to be used for defect detection for each unit of recording (sector or ECC block) is known by reading the control information, and can be used for performing maintenance of the data recorded on the disk.

According to a second aspect of the invention, there is provided a disk device for accessing data on an optical disk, including:

means for determining a criteria for detecting defects according to the type of data for which defects are to be recorded; and means for detecting defects using the criteria when data is recorded on or reproduced from the disk.

With the above arrangement, it is possible to use the criteria suitable for the particular type of data for which defects are to be recorded.

The detecting means may detect said defects with regard to data recorded on the disk.

In this case the defects may be detected when the data is recorded on the disk, or when the data is reproduced for verification of the data having been recorded. When the defects are detected as the data is recorded, servo defects and header defects can be detected, but data defects cannot be detected. When the defects are detected during reproduction for verification, data defects as well as servo defects and header defects can be detected.

The detecting means may alternatively detect defects when the data is reproduced. In such a case, if defects are detected, the reproduction of the data is re-tried. Decision on whether the reproduction is to be re-tried is made using different criteria depending on the type of data being reproduced.

The device may comprise means for managing defects on the optical disk by using non-defective areas of the optical disk in place of defective areas.

With the above arrangement, the result of the defect detection can be used in making a decision as to whether the areas found to be defective should be replaced with non-defective areas.

The determining means may include:

means for storing a plurality of criteria; and means for selecting one of said plurality of criteria according to the type of data for which defects are to be detected.

With the above arrangement, the defect criteria can be determined simply by applying a signal for selecting one of the plurality of criteria provided in advance, rather than specifying the values forming the criteria.

The plurality of criteria may include at least a first criteria, and a second criteria, the second criteria being less strict than the first criteria, and the selecting means may select the first criteria when the data for which defects are to be detected is one for which time restriction with regard to data recording or reproduction is less strict, and selects the second criteria when the data for which defects are to be recorded is one for which time restriction with regard to data recording or reproduction is more strict.

An example of the data for which time restriction with regard to data recording or reproduction is less strict is computer data. An example of the data for which time restriction with regard to data recording or reproduction is more strict is audio or video data.

By using a less strict criteria for the audio or video data, interruption of the audio or video data recording is avoided unless the defect is of such a degree that the resultant sound or picture is intolerable.

The determining means may determine the criteria according to a control signal supplied from outside of the device.

The control signal may be supplied from a host device connected to the disk device.

With the above configuration, the host device can set criteria which is finely optimized for the type or contents of the data for which defects are to be detected.

The device may further comprise means for recording data, in units of recording, on the disk, wherein said determining means may determine the criteria for each of the units of recording, and the recording means may also record criteria control information controlling the criteria for each unit of recording, in association with the each unit of recording.

With the above configuration, the criteria to be used for defect detection for the data of each unit of recording (e.g., sector or ECC block) is known by reading the control information, and can be used for performing maintenance of the data recorded on the disk.

According to a third aspect of the invention, there is provided an optical disk for recording data, including an area storing criteria control information specifying criteria to be used for detecting defects for data recorded on or reproduced from the disk.

With the above configuration, the criteria to be used for detecting defects when the disk is accessed is known by reading the criteria control information recorded on the disk. Accordingly, the maintenance of the data on the disk is facilitated, and the interchangeability of the disk is improved since the criteria control information can be read by any disk device.

The data may be recorded in units of recording, and the criteria control information indicating the criteria to be used for detecting detect with regard to the each unit of recording may be recorded in association with the each unit of recording.

With the above configuration, the criteria to be used for each unit of recording, e.g., sector or ECC block, is known by reading the criteria control information, and can be used for performing maintenance of the data recorded on the disk.

The information may select said criteria from a plurality of predetermined criteria.

With this configuration, the amount of control information is small, since it only needs to specify one of the plurality of predetermined criteria, rather than specifying values forming the criteria itself.

BRIEF DESCRIPTION OF THE DRAWINGS

In the accompanying drawings:

FIG. 6 is a table summarizing two sets of defect criteria;

FIG. 7 is a table summarizing three sets of defect criteria;

FIG. 9 is a diagram showing an example of procedure followed for setting defect criteria;

FIG. 10 is a diagram showing another example of procedure followed for setting defect criteria;

DETAILED DESCRIPTION OF PREFERRED EMBODIMENTS

Figure 1:
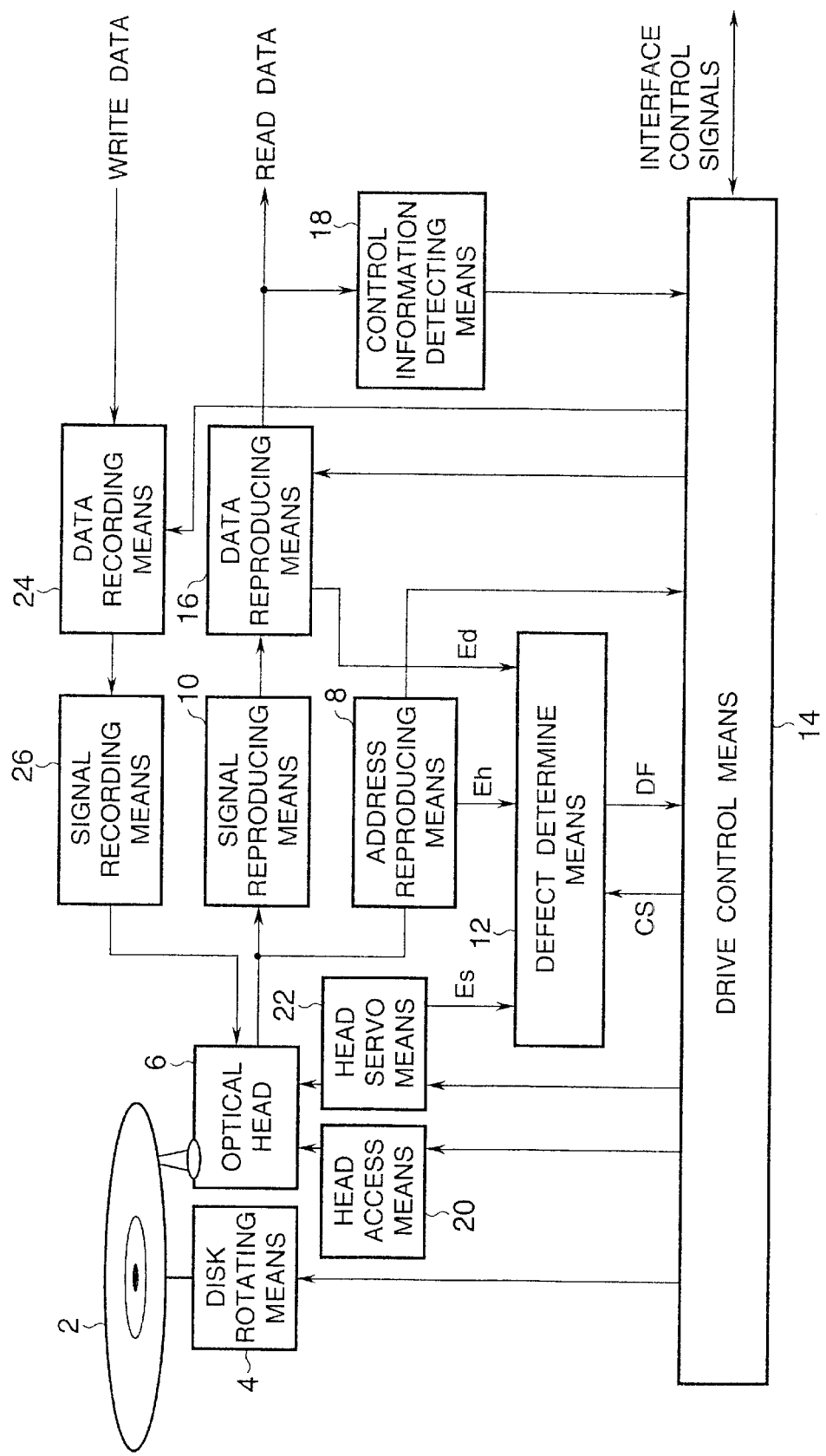
FIG. 1 is a block diagram of an optical disk device of an embodiment of the present invention.

Embodiments of the invention will now be described with reference to the attached drawings, in which like parts are indicated by like reference characters.

FIG. 1 is a block diagram of an optical disk device used to implement the defect management method according to the invention. A disk rotating means 4 controls rotation of an optical disk 2 for recording and reproducing data. An optical head servo means 22 performs position control over an optical head 6 such that a light spot formed by a light beam focused by the optical head 6 follows the track on the disk 2.

The light reflected from the optical disk 2 representing the data recorded on the disk 2 is converted in the optical head 6 into an electrical signal, which is supplied to an address reproducing means 8 and a signal reproducing means 10. Based on an ID signal in the header, the address reproducing means 8 reproduces the address of a sector currently accessed. The detected address is sent to a drive control means 14. The signal reproducing means 10 reproduces signals from the signals supplied from the optical head 6 in accordance with the recording format. A data reproducing means 16 corrects errors in the reproduced signals to produce information, and outputs information to a host device (not shown) as reproduced data of the desired logical block.

At that moment, the data reproducing means 16 can recognize a sector in which the required data is recorded on the basis of control signals received from the drive control means 14. Concurrently, the drive control means 14 sends a command to control the rotational speed of the disk 2, to the disk rotating means 4. Further, the drive control means 14 determines the position on the disk, of the sector containing the information to be reproduced, and sends commands to the optical head access means 20 for moving the optical head 6 to the position of the sector. The drive control means 14 also sends commands to control the operation of the servo system. The optical head access means 20 and the optical head servo means 22 control the position of the optical head 6 in accordance with the received commands.

A defect management control information detecting means 18 reads control information necessary for performing defect management, from the reproduced data, and obtains information concerning defect management such as defect management method applied to the disk, arrangement of spare areas and user areas, status of use of substitutive sectors, and defect criteria. The information thus obtained is sent to the drive control means 14 and used for controlling devices engaged in defect management at the time of recording or reproducing data.

Incidentally, all the sectors on the disk are numbered with consecutive addresses from the inner or outer periphery of the disk. However, the addresses of user data recording sectors are not consecutive. This is because the physical addresses are assigned not only to the user data recording sectors, but also to sectors in spare areas provided for defect replacement and sectors in guard areas at zone boundaries in the case of a zone format disk.

At the time of performing access from the host device through an interface, logical block numbers of a file system are used. Therefore, the disk device needs to perform conversion between a logical block number and a sector address. The conversion is carried out by the drive control means 14 in accordance with received information on defect management.

In writing operation, data sent from the host device is first inputted to a data recording means 24. The data recording means 24 performs error correction coding on the data in accordance with a format, and outputs the data as signals to be recorded, with timings controlled in accordance with the sector addresses on the disk, having been detected by the control signals supplied from the drive control means 14.

A signal recording means 26 modulates the received signals in accordance with a recording format and sends them to the optical head 6.

The optical head 6 writes the signals into the optical disk 2 by driving a laser.

At this moment, the optical head 6 is controlled such that a light spot traces the sector the data is to be recorded, by means of the optical head access means 20 and the optical head servo means 22.

The drive control means 14 stores defect management control information detected by the defect management control information detecting means 18 at the time of disk loading. The logical block number of the block to be accessed is given by an interface control signal supplied from the host device, not shown. To be more specific, the host device sends a recording command specifying the logical block number of the block where the data is to be written, and the like, to the disk device, together with the data to be recorded, or sends a reproducing command specifying the logical block number of the block from which the data is to be read and the like, to the disk device.

The drive control means 14 converts the logical block number of the block to be accessed, to physical addresses, using defect management information, and sends a command specifying the physical addresses of the sectors to be accessed, to the optical head access means 20 and data recording means 24 or data reproducing means 16. The physical addresses of the sectors currently accessed are reproduced by the address reproducing means 8, and inputted to the drive control means 14. Drive control operations such as control over the optical head access means 20 and data recording means 24 or data reproducing means 16 are performed on the basis of the detected current address and the target address.

A defect determining means 12 makes judgment as to whether a sector is defective and is to be replaced. The defect determining means 12 receives information necessary for defect determination on each sector from the optical head servo means 22, address reproducing means 8, and data reproducing means 16, and determines presence or absence of a defect in accordance with a defect criteria set by the drive control means 14, and reports the results of the determination to the drive control means 14. When the sector having been accessed is determined as a defective sector, the drive control means 14 performs the necessary processes. During recording, the drive control means 14 interrupts the recording operation and causes the data of the block to be re-recorded in substitutive sectors. During verifying reproduction, the drive control means 14 causes the data of the block having been recorded, to be re-recorded in substitutive sectors. During reproduction, the drive control means 14 causes the reproduction to be re-tried. These operations are pre-programmed into the drive control means 14.

Figure 2:
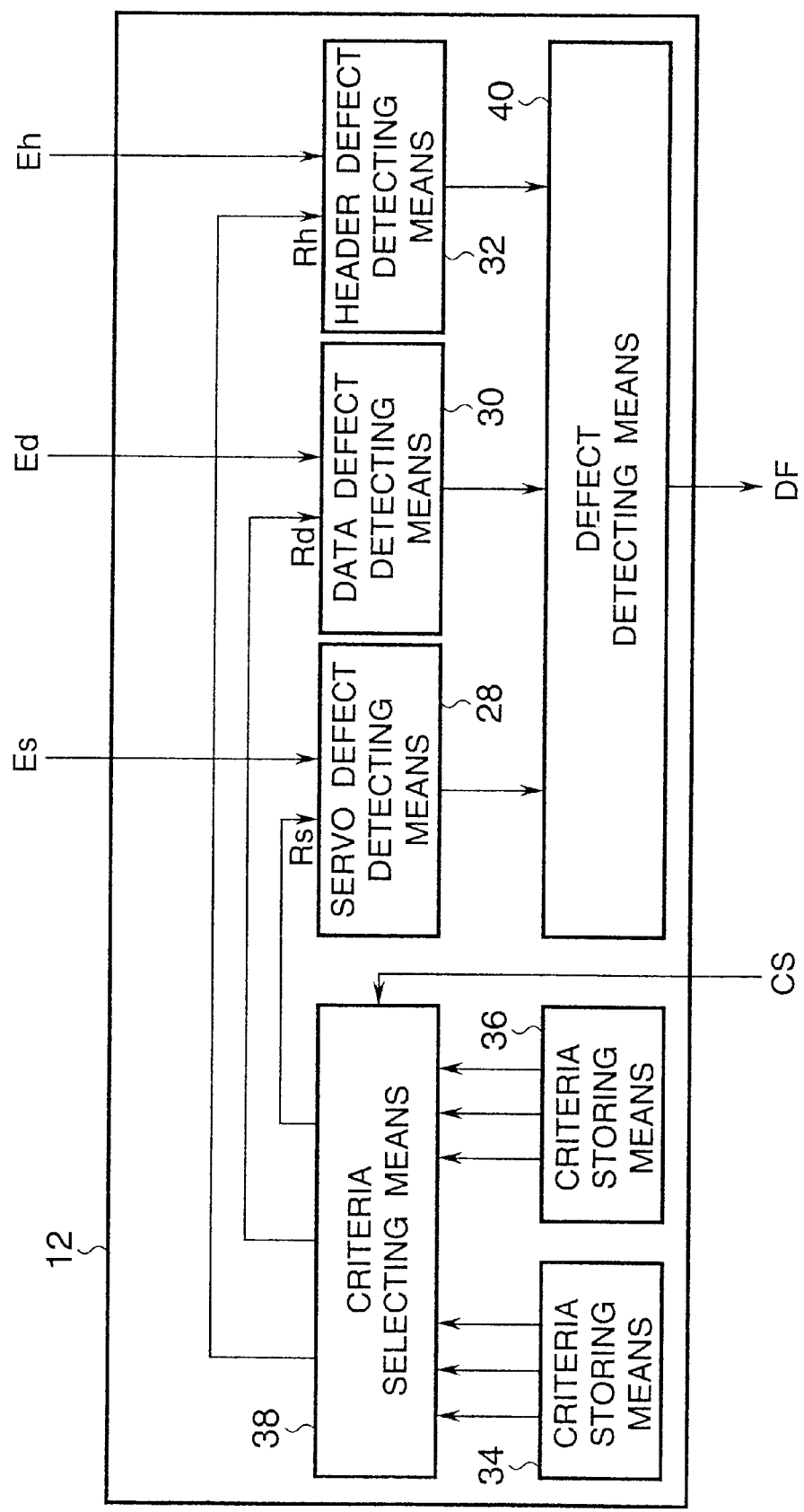
FIG. 2 is a block diagram of a defect determining means used in the optical disk device of FIG. 1.

FIG. 2 shows the configuration of the defect determining means 12. It receives servo error signals such as a tracking error signal and a focus error signal from the optical head servo means 22. It also receives a header error signal representing the number of errors in ID's reproduced for each sector, from the address reproducing means 8. It also receives a data error signal representing the number of errors in the reproduced data from the data reproducing means 16.

In this embodiment, the defect determining means 12 includes two defect criteria storing means 34 and 36 for storing different defect criteria A and B, respectively. The two defect criteria A and B are inputted to a defect criteria selecting means 38, which selects and outputs either one of the two criteria A and B in accordance with a defect criteria setting signal CS. There are three outputs, Rs, Rd, and Rh. A reference signal Rs for detecting a servo defect is inputted to a servo defect detecting means 28, a reference signal Rh for detecting a header defect is inputted to a header defect detecting means 32, and a reference signal Rd for detecting a data defect is inputted to a data defect detecting means 30. They are compared with a servo error signal Es, a header error signal Eh, and a data error signal Ed in the respective defect detecting means 28, 32 and 30, to detect presence or absence of a servo defect, a header defect, and a data defect. A defect detecting means 40 receives the outputs of the defect detecting means 28, 32 and 30, and outputs a defect detection signal DF when at least one of the defects has been detected.

Figure 3A:
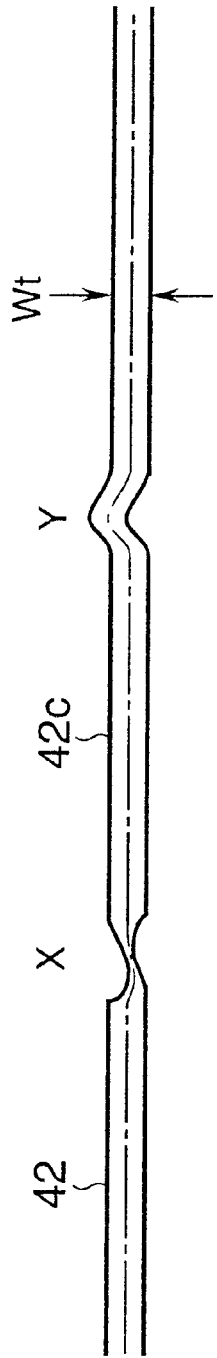
FIG. 3A is a schematic diagram showing examples of deformation of a groove forming a track.
Figure 3B:
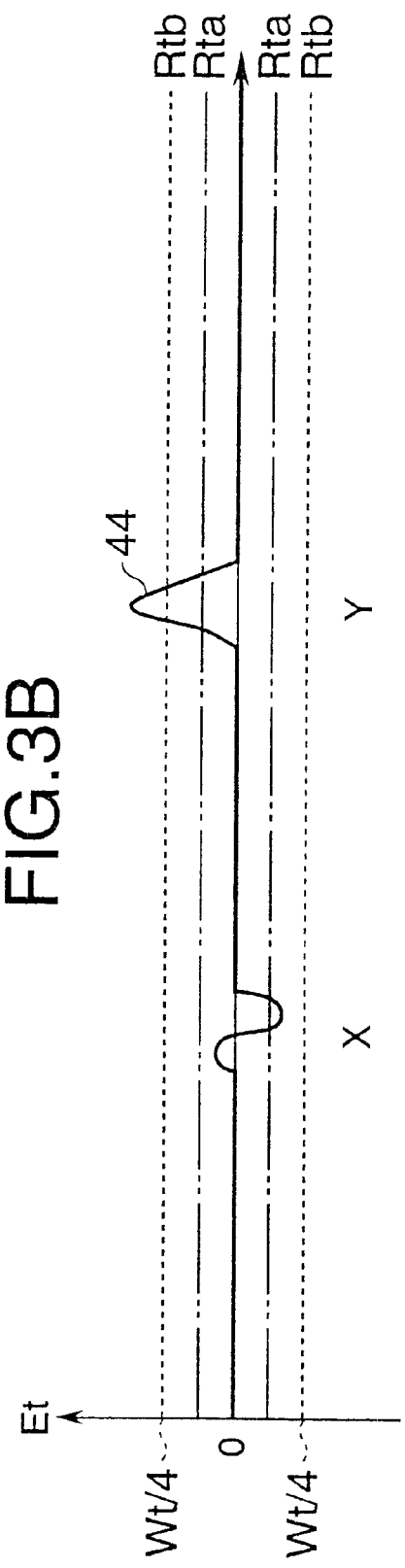
FIG. 3B is a time chart showing a tracking signal obtained when the light spot follows the track shown in FIG. 3A.

Referring to FIG. 3A and FIG. 3B, detection of a servo defect will be described. For recording data, a track which has a substantially uniform width Wt (the track is actually circular or spiral, but the short part of the track illustrated can be treated as straight) is used. The track is formed of a continuous guide groove or the like. Consideration will be given to the case where the track is deformed at points X and Y. Such deformation may be caused due to dirt introduced during fabrication of a master disk or a substrate, irregular operation of a manufacturing machine, unevenness of a formed substrate, and other minor irregularities. Tracking control is performed such that a light spot follows the centerline 42c of the track shown by a chain line in FIG. 3A, and a tracking error signal Et shown in FIG. 3B is obtained. The tracking error signal Et is zero when the light spot is following the centerline 42c of the track. When the light spot deviates from the centerline 42c, the tracking error signal Et deflects either positively or negatively depending on the direction and the amount of deviation. Where there is a deformation of the track and the centerline 42c of the track is bent abruptly, since the light spot cannot follow the abrupt bending, the light spot deviates from the centerline 42c.

At point X, there is a deflection in the tracking error signal Et due to the deformation of the track. At point Y, there is also a deflection in the tracking error signal Et due to meander of the track. If the tracking error tolerance limit Rtb shown by the broken line in FIG. 3B is given as a reference for determining a servo defect, a servo defect is recognized at point Y. If a more strict tracking error tolerance limit Rta shown by the chain line in the figure is given, servo defects are recognized both at points X and Y.

The tracking error tolerance limit Rta corresponds to the value of the tracking signal Et when the deviation of the light spot is one-fourth the tracking width Wt, and the tracking error tolerance limit Rtb corresponds to the value of the tracking signal Et when the deviation of the light spot is one-eighth the tracking width Wt.

For instance, if the level Rta at the chain line is used as the defect criteria A, and the level Rtb at the broken line the figure is given as the defect criteria B, it is possible to perform servo defect determining process at two different levels. Incidentally, the recording track may not be a continuous groove. In a disk, such as a DVD-RAM, where user data recording areas are formed of lands and grooves, and no groove is formed at the header parts, which are formed of pre-pits only, it is sufficient to perform a servo defect detection only for areas where a groove continues.

Servo defect detection can be performed with regard to a focus error signal, in the same way as the tracking error signal.

Figure 4A:
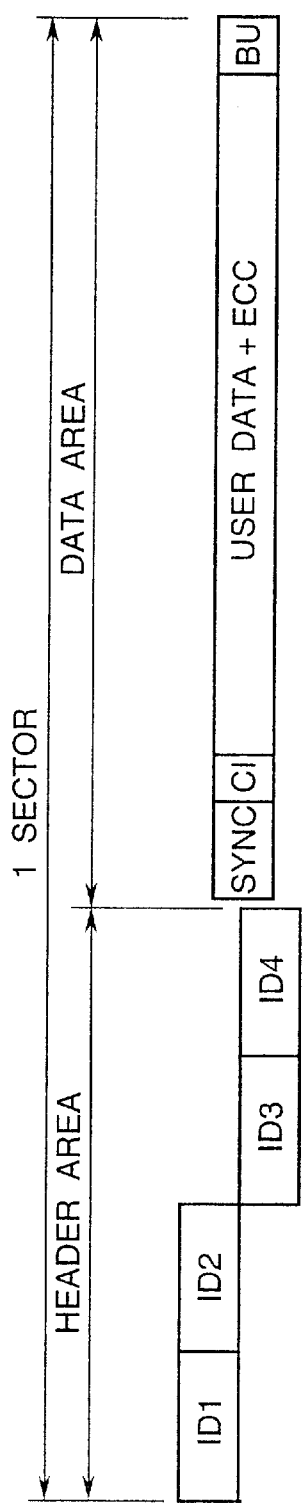
FIG. 4A is a diagram showing the configuration of a sector on a DVD-RAM.
Figure 4B:
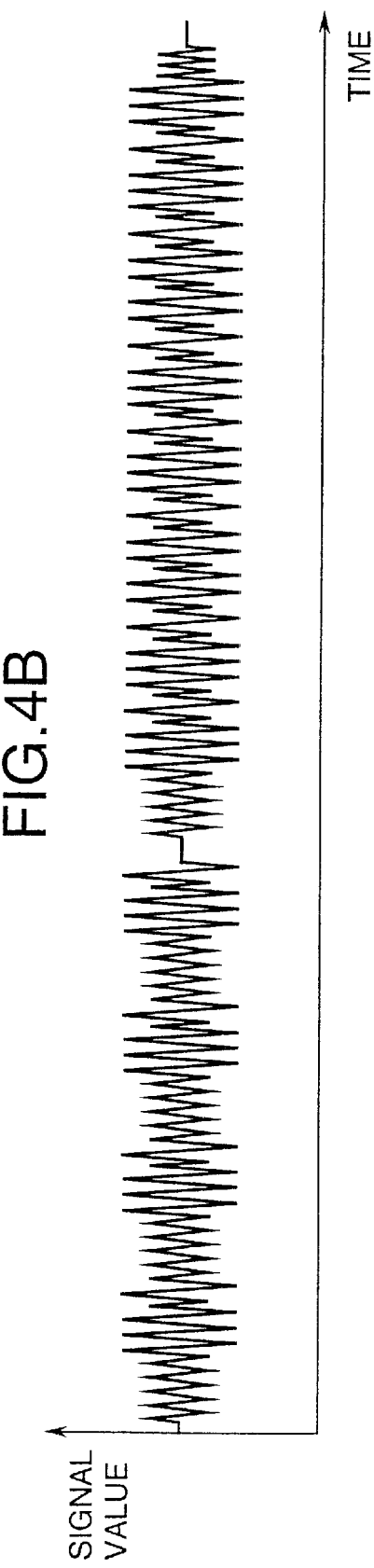
FIG. 4B is a schematic diagram showing the signal obtained when the light spot follows the sector shown in FIG. 4A.

FIG. 4A shows the configuration of a sector in a groove track in a DVD-RAM, and FIG. 4B shows the waveform of the signal reproduced from the sector shown in FIG. 4A. These drawings will be used for describing the detection of header defect. A recording sector of a DVD-RAM includes a header area having a sector address and the like at the beginning, followed by a data area for recording user data. The header area includes four ID's, indicated as ID1 to ID4 each containing address information representing a sector address. In the sector shown in FIG. 4A, ID1 and ID2 are displaced one-half the track width Wt toward the outer periphery of the disk, and are shared with a sector in the outer adjacent land track, while ID3 and ID4 are displaced one-half the track width Wt toward the inner periphery of the disk, and are shared with a sector in the inner adjacent land track.

In a land track not shown, ID1 and ID2 are displaced by one-half the track width Wt toward the inner periphery of the disk, and are shared with a sector in the inner adjacent groove track, and ID3 and ID4 are displaced by one-half the track width Wt toward the outer periphery of the disk, and are shared with a sector in the outer adjacent groove track. The waveform of the signal reproduced from the header area and the data area in a sector in a land track is also shown in FIG. 4B.

The data area following the header is in a groove or a land, and contains a synchronous signal (SYNC), control information (CI), user data, and an error-correcting codes, and a buffer, which are recorded successively in this order. The control information CI consists of a small amount of information (such as the data number of the sector), other than user data.

The size of user data, together with the control information, in one sector is 2 KB (kilobytes), and error-correcting coding is performed taking the user data and the control information of 32 KB in 16 successive sectors, as a unit, wherein error-correcting codes are added to the to form an ECC block.

The error-correcting codes are distributed over the 16 sectors.

The sector address can be obtained if even one of the four ID's in a header is read correctly. In criteria B, if none of the four ID's is read correctly, the sector is found have a header defect, and if two or more sectors within an ECC block are found to have a header defect, the ECC block is found to have a header defect. In criteria A, if not more than one of the four ID's is read correctly, the sector is found have a header defect, and if one or more sectors within an ECC block are found to have a header defect, the ECC block is found to have a header defect.

A sector found to be non-defective according to criteria A has at least two correctly readable ID's. This make it more likely that at least one ID will remain correctly readable even if the disk is later soiled or degraded, or transferred to another disk device.

In this way, it is possible to perform header defect determination with two different levels.

Figure 5:
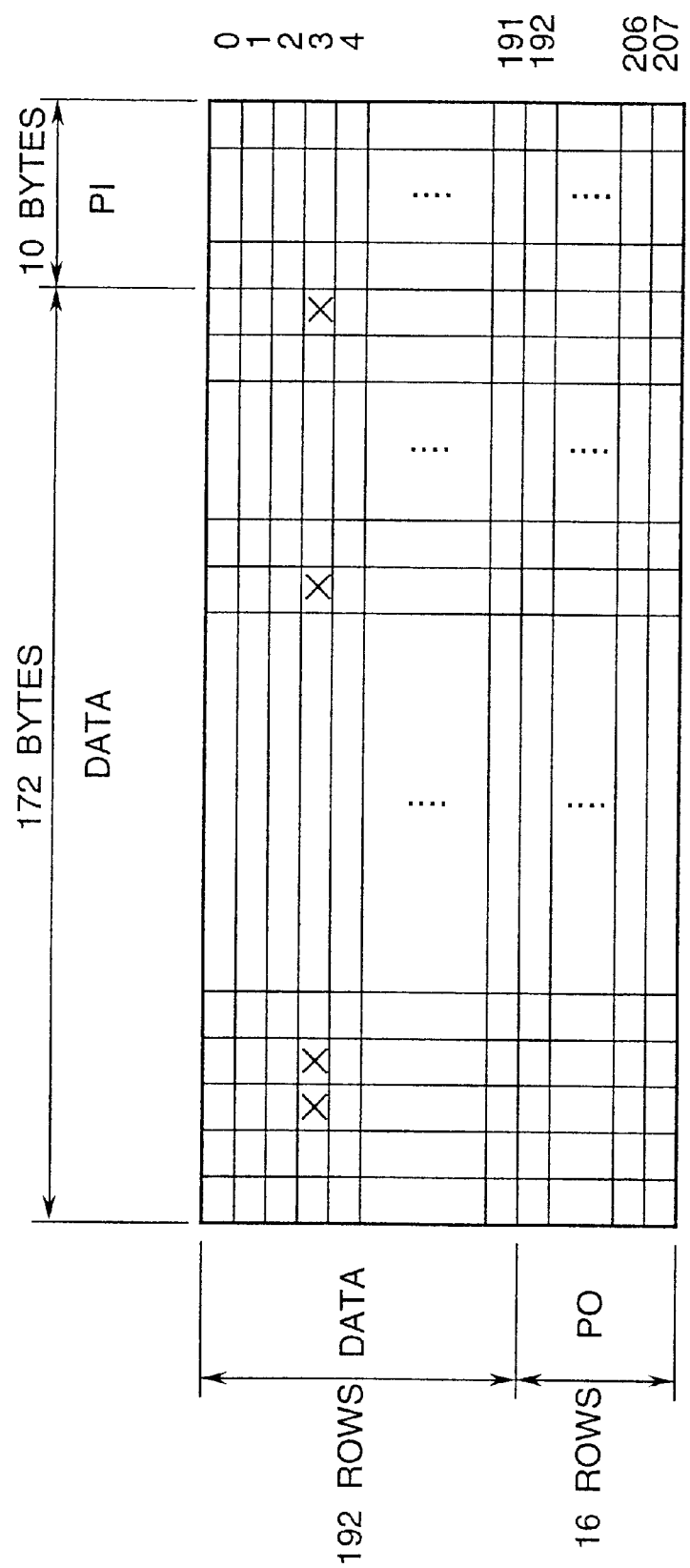
FIG. 5 is a diagram showing an example of errors in an error correcting block.

FIG. 5 shows the structure of an ECC block in a DVD-RAM. This drawing is used to describe the data defect detection. In the data recording means 24, the 23 KB data for 16 sectors are arranged in the form of matrix of 172 bytes in the row direction by 192 bytes in the column direction. A 16-byte parity outer code PO in the column direction is added to each column, and then 10-byte parity inner code PI in the row direction is added to each row.

Thus, a product code, which is a Reed-Solomon code, of 182 bytes×208 bytes is formed.

When the data is recorded on the optical disk 2, the PO rows are interleaved with the other rows so that the error-correcting code bytes are evenly distributed over all 16 sectors of the ECC block.

At the time of reproduction, the data reproducing means 16 rearranges the reproduced signal into a matrix of 182 bytes×208 bytes, and first detect and correct any errors of each row by means of the 10-byte inner code PI. The inner code PI is capable of correcting errors in up to five bytes per row, and detecting errors in up to ten bytes per row.

Next the 16-byte outer code PO is used to detect and correct any remaining errors. The outer code PO is capable of correcting errors in up to 8 bytes per column, and detecting errors in up to 16 bytes per column. These error detecting and correcting capabilities can be improved by repeating the PI-PO error correction process, although the additional repetitions require additional circuitry and additional time.

When a large number of errors are detected and corrected, it becomes likely that some of the corrections are wrong, the corrected data differing from the original data. Criteria A and B are therefore set, for example, as follows. In criteria A, a row is considered to have a data defect if errors are detected in at least four bytes, which is close to the error-correcting limit of the PI code, and an ECC block is considered to have a data defect if it has at least eight rows having a data defect. In less strict criteria B, a row is considered to have a data defect if errors are detected in at least eight bytes, which is close to the repeated error-correcting limit of the PI code, and an ECC block is considered defective if it has at least eight rows having a data defect. When an ECC block is considered to have a data defect, all sixteen of its constituent sectors are replaced.

In this way, it is possible to perform data defect determination with two different levels.

In FIG. 5, row three has errors in four bytes, indicated by x's. This row is deemed to have a data defect under criteria A, but not under criteria B.

In this way, the presence or absence of defect in each sector can be determined with respect to each of the servo defect, the header defect, and the data defect, according to the defect criteria supplied to each defect detecting means. FIG. 6 summarizes the defect criteria A and B described above described as examples for the respective defects. The set of criteria A are stored in the criteria storing means 34, while the set of criteria B are stored in the criteria storing means 36. It is then possible to switch between the two levels of criteria A and B by means of the criteria selecting means 38, according to the criteria setting signal CS.

In the case of recording computer data, a high reliability is required so that the data once recorded are not lost or changed. For this reason, verifying reproduction is often effected at the time of recording. Accordingly, during recording and during verification production, the strict criteria A is applied to ensure that the correct data is recorded.

In contrast, in the case of audio or video data, continuous recording at a high transfer rate is required. Accordingly, verifying reproduction is often omitted, ignoring data defects. Even if some defects occur during recording, as long as occurrence of the defects is of such a degree that the defects can be corrected or concealed later at the time of reproduction, it is preferable to continue recording operation ignoring the defects, since it will improve the performance and the operability as a recorder. For this reason, the criteria set for servo defects and header defects are set at a less strict level at which the recorded data can be corrected or concealed.

When the two different defect criteria A and B available, the strict criteria A is used for recording computer data, while the less strict criteria B is used for recording audio or video data.

There are situations where more than two different levels of reliability are required depending on types of data to be recorded. For instance, there is a situation where three different levels are required, one for recording computer data, another for recording important audio or video data, and the last one for recording normal audio or video data. In such a situation, as shown in FIG. 7, provision is made to enable switching among three different defect criteria A, B, and C. Criteria A and B are the same as those described with reference to FIG. 6, and are used for recording computer data and for recording normal audio or video data, respectively.

The criteria C is used for recording important audio or video data, and therefore, it has strictness intermediate between the criteria A and B. In the criteria C, the allowable deviation in tracking error is one-sixth the track width Wt, and an ECC block is found to have a header defect if all four ID's are unreadable in any one sector. Regarding data defects, criteria C and A are the same.

To use the three different sets of defect criteria, the defect determining means 12 should have an additional criteria storing means, in addition to the members shown in FIG. 2, and the criteria selecting means 38 should be able to select among the criteria A, B and C supplied from the above-mentioned additional criteria storing means, as well as the criteria storing means 34 and 36 in FIG. 2, in accordance with the criteria setting signal CS.

Figure 8:
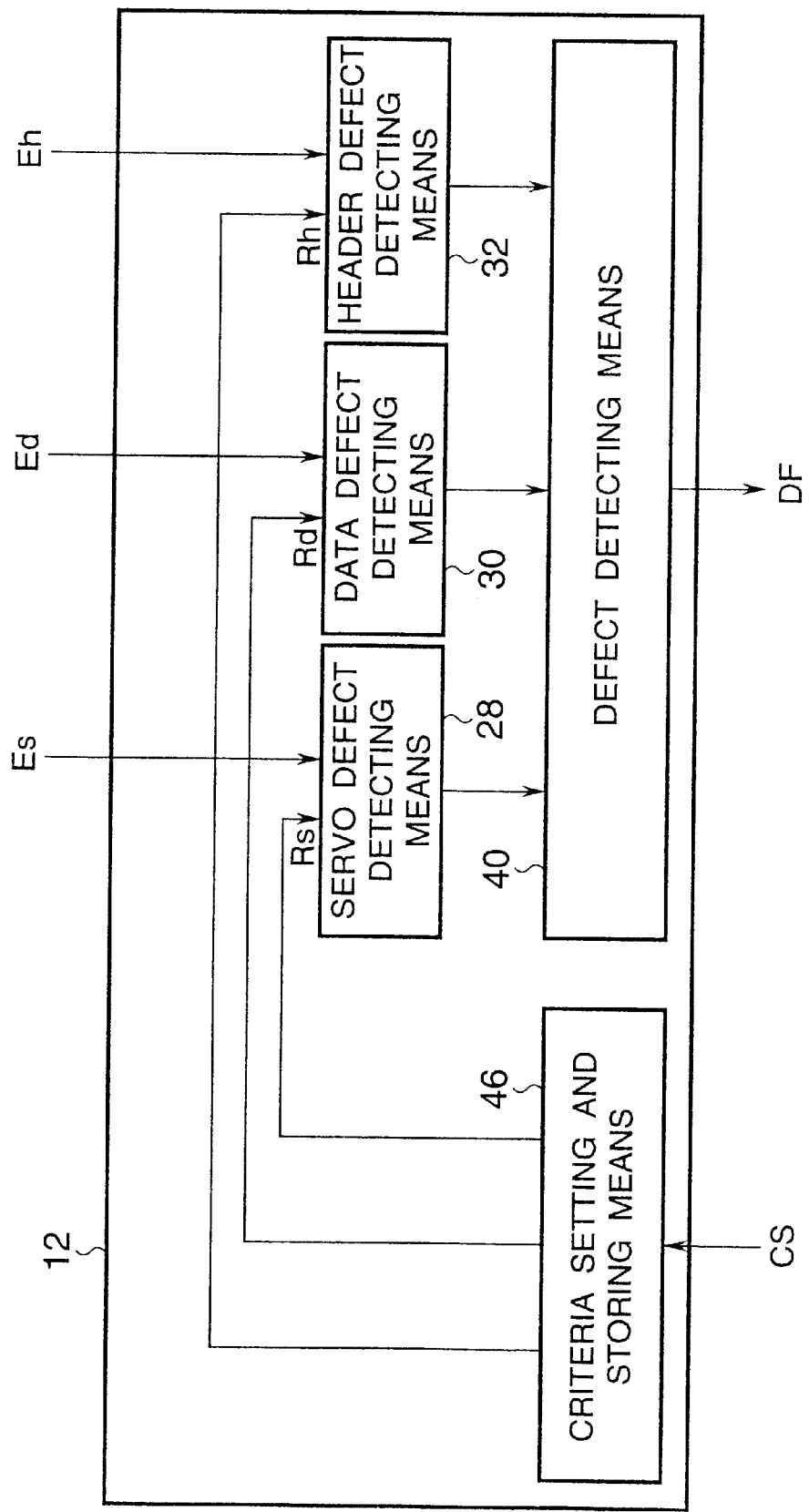
FIG. 8 is a block diagram of a defect determining means of another embodiment.

FIG. 8 shows another embodiment of the defect determining means 12. The configuration of FIG. 8 is different from the configuration of FIG. 2 in that the criteria storing means 34 and 36, and the criteria selecting means 38 which makes selection according to the criteria selecting signal CS shown in FIG. 2 are replaced with a defect setting and storing means 46 which makes setting according to the criteria selecting signal CS.

The defect criteria to be applied is supplied from a host device (not shown) through an interface to the drive control means 14. In response, the drive control means 14 generates a criteria setting signal CS specifying the criteria.

In the defect determining means 12 of FIG. 2, the defect criteria stored in the respective criteria storing means are fixed. However, in practical use, it may be desirable that the host device which controls the disk device (recording device) can flexibly vary the criteria so as to optimize the reliability and the transfer rate, depending on the nature, type, characteristics, and the degree of importance of the data to be recorded. For instance, a countermeasure for errors may be provided in the application software or file system. That is, error correcting coding may be applied before transmitting the data to the disk device at a predetermined rate. In this case, the defect management at the disk device is not so important, and the capability of continuous real-time recording at a high data transfer rate may be important.

The embodiment described above can meet with these requirements.

An embodiment of procedure followed in setting a defect criteria will be described with reference to FIG. 9. First, the host device sets the defect criteria to be used, according to type or contents of the data to be recorded. Then, a command for setting the criteria is sent from the host device to the disk device (drive). The disk device selects or sets the criteria upon reception of the command accordingly. In the system shown in FIG. 2, the command sent from the host device to the disk device is one for merely specifying selection between the criteria A and B. In the system shown in FIG. 8 in which the defect criteria can be set, the system is so configured that the defect criteria can be set arbitrarily at the host device, and the command indicates the defect criteria set at the host device. Details of the command for setting the defect criteria may be one which will be described later with reference to FIG. 11, in which the defect criteria control information can select one among a plurality of criteria independently, for each of the servo defect, header defect, and data defect.

The host device then sends a recording command together with the data to be recorded. Upon reception of the command, the disk device records data in the specified sectors, and performs the defect management using the defect criteria set in the manner described above, and reports the results of the defect management to the host device. The host device terminates a series of recording when it confirms that recording has been completed correctly. If the recording has been done incorrectly, a predetermined process (re-writing or informing the user) for dealing with the incorrectness is carried out.

According to the procedure of FIG. 9, the host device, which knows the contents of the data to be recorded, sets the defect criteria finely optimized according to the type or contents of the data. It is therefore possible to provide flexibility for obtaining an optimum combination of reliability and transfer rate according to the intended use of the data.

FIG. 10 shows another embodiment of a procedure followed for setting a defect criteria. In this embodiment, a command which sets a defect criteria and also instructs data recording is sent. First, the host device determines a defect criteria to be used in accordance with the type or contents of the data to be recorded, and then prepares the data to be recorded. This order may be reversed.

Then, the host device sends the recording command which also sets the defect criteria, to the disk device. In accordance with the designated defect criteria, the disk device selects or sets the criteria. The designation of the setting sent from the host device to the disk device may be one for specifying selection among a plurality of preset criteria (such as between the criteria A and B), or one for setting an arbitrary criteria.

The disk device records the data received together with the command, on the disk, while performing defect management in accordance with the defect criteria which has been set as described above, and informs the host device of the result. According to this embodiment, it is possible to obtain an optimum combination of reliability and transfer rate depending on the intended use of the disk, as in other embodiments described earlier. Moreover, because the number of commands transferred is reduced, the overhead is reduced, and the possibility of the transfer rate becoming lowered is reduced.

Figure 11:
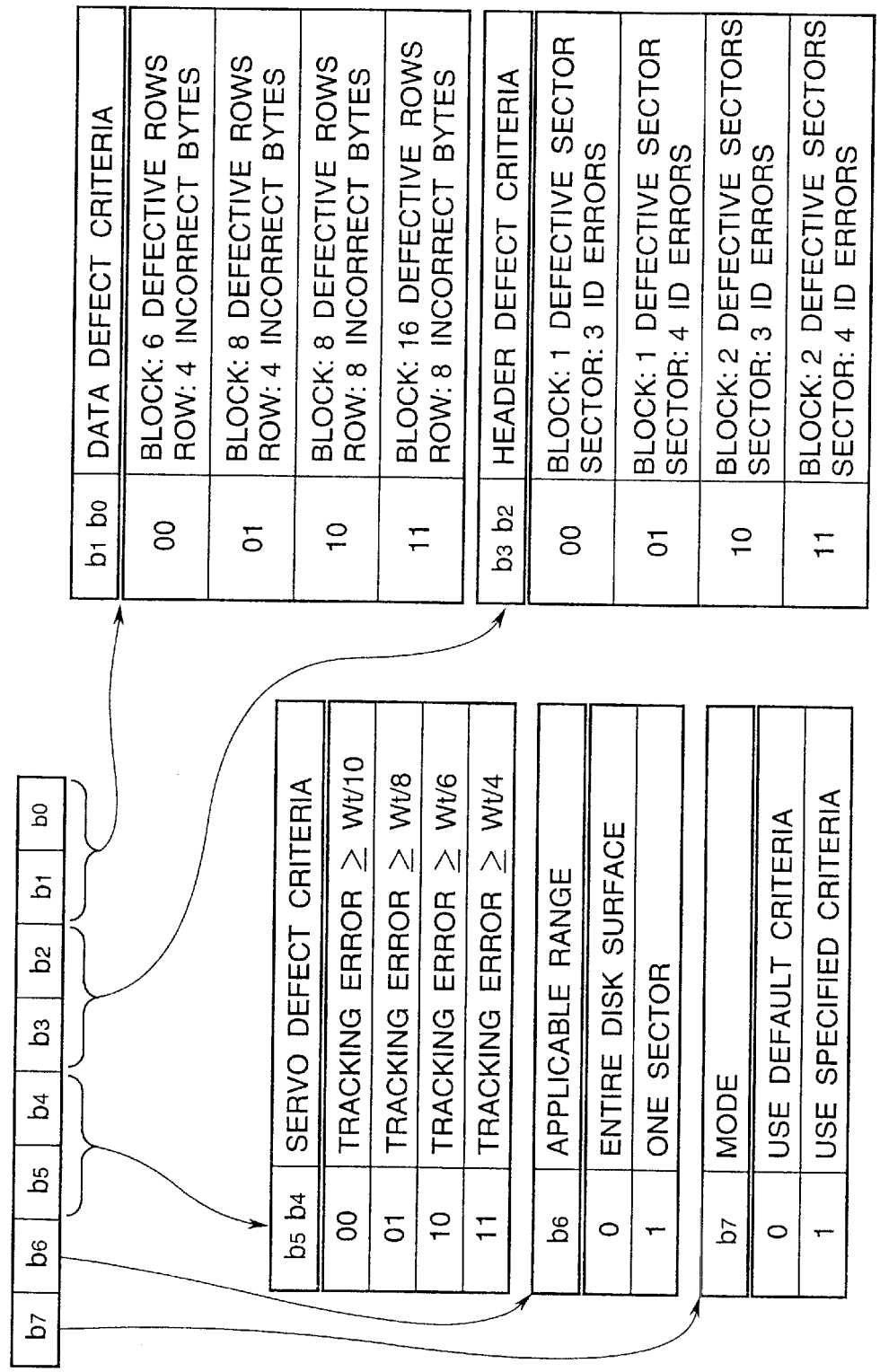
FIG. 11 is a diagram showing the configuration of an example of defect criteria control information.

A manner of recording control information representing the defect criteria designated at the time of data recording, in every sector on a disk will now be described. FIG. 11 shows the configuration of a defect criteria control information. With this configuration, one of four different criteria can be specified for each of the servo defect, the header defect and the data defect independently, by using one byte.

The most-significant bit b7 indicates the mode of designation of the defect criteria. If the value of bit b7 is "1", the mode designated by other bits of the control information byte is used, while if the value is "0" the default criteria which the disk device has is used ignoring the other bits of the control information byte.

The next bit b6 indicates the range within which the defect criteria should be applied. If the value of bit b6 is "1", the mode set by other bits in the control information byte of are applied for each unit of recording, e.g., each sector or block. If the value of bit b6 is "0" the same criteria is to be applied over the entire surface of the disk.

The next two bits (b5 and b4) indicate the criteria applied for the servo defect, among the four criteria. If the combined value of bits b5 and b4 are "11" the tracking error tolerance above which the servo defect is recognized is one-forth the track width Wt. If the combined value is "10" the tolerance is one-sixth the track width Wt. If the combined value is "01" the tolerance is one-eighth the track width Wt. If the combined value is "00" the tolerance is one-tenth the track width Wt.

The next two bits b3 and b2 indicate the defect criteria to be applied for the header defect, among the four criteria. If the combined value of the bits b3 and b2 is "11" the ECC block is found to have a header defect if all four ID's are unreadable at two or more of its sectors. If the combined value is "10" the ECC block is found to have a header defect if three or more ID's are unreadable at two or more of its sectors. If the combined value is "01" the ECC block is found to have a header defect if all four ID's are unreadable at one or more of its sectors. If the combined value is "00" the ECC block is found to have a header defect if three or more ID's are unreadable at one or more of its sectors.

The last two bits b1 and b0 indicate the defect criteria to be applied for the data defect, among the four criteria. If the combined value of the bits b1 and b0 is "11", the ECC block is found to have a data defect if at least 16 of its rows have errors in at least 8 bytes each. If the combined value is "10", the ECC block is found to have a data defect if at least 8 of its rows have errors in at least 8 bytes each. If the combined value is "01", the ECC block is found to have a data defect if at least 8 of its rows have errors in at least 4 bytes each. If the combined value "00", the ECC block is found to have a data defect if at least 6 of its rows have errors in at least 4 bytes each.

The above described defect criteria control information can be located in each sector which constitutes a minimum unit of recording. In a DVD-RAM, a one-byte area may be reserved in the control information area located at the beginning of the data area shown in FIG. 4. The criteria may be set for each sector separately. The same defect criteria control information may be set in all the sectors within the same ECC block, or in predetermined sectors, so that the defect criteria control information is repeatedly recorded, and the range within which the same defect criteria should be applied may be made to coincide with the unit of error correction (ECC block).

The provision for enabling setting the finely optimized criteria improves the utility for the user in multimedia applications in which the audio or video data and computer data are intermixed with each other. It should be noted that the defect criteria to be applied to the respective data can be switched at the system (host device) depending on the contents of the data, and it is possible to realize a flexibility for obtaining the optimum combination of the reliability and transfer rate.

Figure 12:
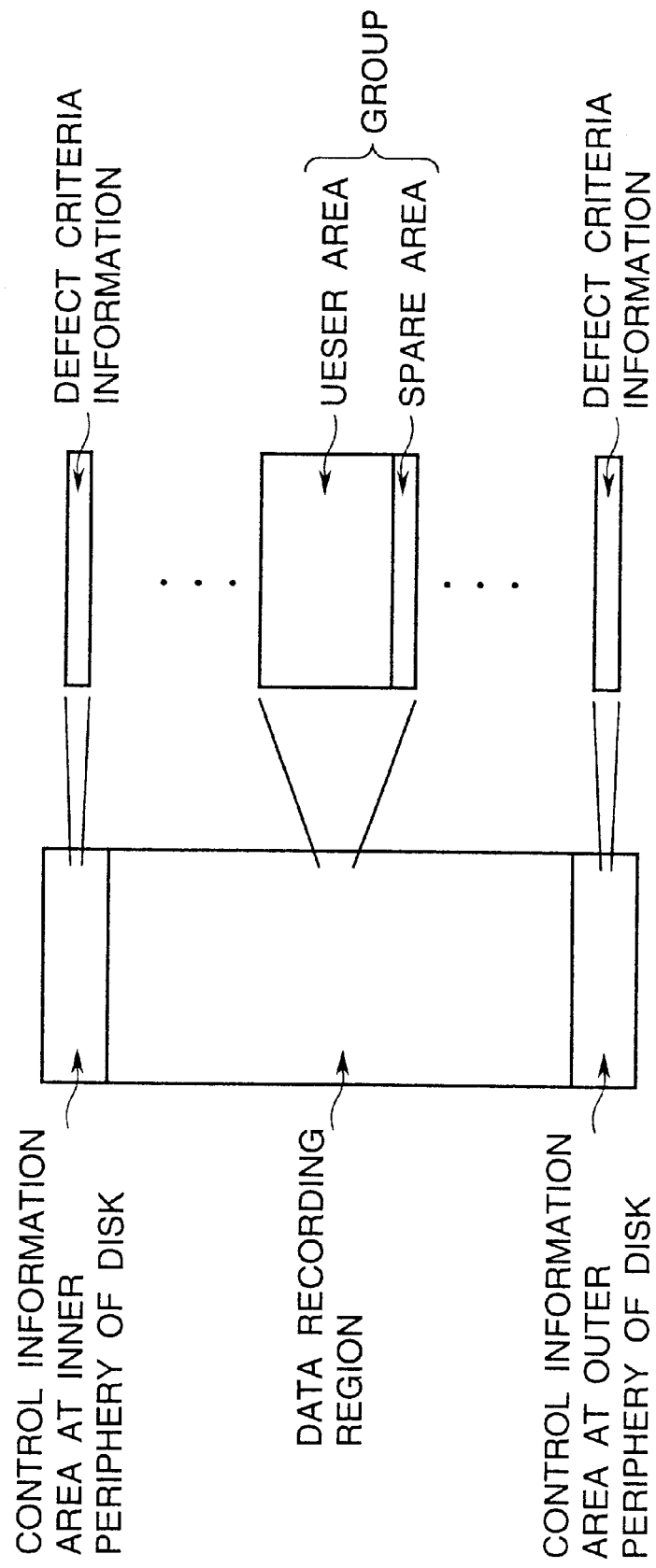
FIG. 12 is a view showing arrangement of information for controlling defect criteria on an optical disk.

It is possible to pre-select a defect criteria to be used in recording on a disk, and record the criteria as defect criteria control information on the disk, before the disk is used. FIG. 12 shows an example of arrangement of control information areas, and a data recording region including user areas and spare areas, and arrangement of defect criteria control information in the control areas. The data recording region is divided into groups, each of which includes a user area and a spare area. The control information areas are disposed near the inner and outer peripheries of the disk, and the same control information is recorded on the respective control information areas.

In a known example, a defect management method is recorded in a control information area. In contrast, according to this embodiment, defect criteria control information is stored in a control information area. At the time of starting a disk, the disk device reads the defect criteria control information to know the defect criteria. If the defect criteria suitable for the intended use, such as computer data, audio or video data, or the like is recorded, the defect determination according to the defect criteria can be made.

If one bit is provided in the control information area for recording the defect criteria control information, it is possible to record two sets of defect criteria, and selectively use them. For recording three or four sets of defect criteria, and using them selectively, two bits should be provided in the control information area. If one byte is provided in the control information area, it is possible to select one of the criteria for each of the servo defect, data defect and header defect, and to specify a combination of specific defect criteria for the respective types, as described with reference to FIG. 11.

With such a provision, if the information is recorded once at the time of initialization of the disk, the defect criteria can be applied to all the data thereafter recorded on the disk. It is therefore possible to eliminate to need to set the defect criteria each time the data is recorded. Accordingly, the recording can be effected at a high speed, and in a simple manner.

What is claimed is:

1. A method of managing defects on an optical disk used for recording data, comprising:

determining a condition of defect management according to the type of data for which defects are to be detected; and processing said defects using said condition when data is recorded on or reproduced from said disk;

wherein said condition includes at least one of a first condition and a second condition, said second condition being less strict than said first condition, said method further comprising:

selecting one of said first condition and said second condition according to the type of data, said selecting step selecting said first condition when the data for which defects are to be detected is data for which time restriction with regard to data recording or reproduction is less strict, and selecting said second condition when the data for which defects are to be detected is data for which time restriction with regard to data recording or reproduction is more strict.

2. A method of managing defects on an optical disk used for recording data, comprising:

determining a condition of defect management according to the type of data for which defects are to be detected; and processing said defects using said condition when data is recorded on or reproduced from said disk;

further comprising:

sending control information, relating to a type of data to be recorded on or reproduced from the disk, from means for processing data to be recorded to means for recording said data;

wherein said control information relating to a type of the data to be recorded on or reproduced from the disk is for selecting one of a plurality of defect management conditions.

3. A device for recording data to or reproducing data from an optical disk, comprising:

means for determining a condition of defect management applied to the data according to the type of data being recorded or reproduced, and, means for managing disk defects using said condition when data is recorded on or reproduced from said disk, wherein said condition of defect management includes at least one of a first condition and a second condition, said second condition being less strict than said first condition, said device further comprising:

means for selecting one of said first condition and said second condition according to the type of data, said selecting means selecting said first condition when the data for which defects are to be detected is data for which time restriction with regard to data recording or reproduction is less strict, and selecting said second condition when the data for which defects are to be detected is one for which time restriction with regard to data recording or reproduction is more strict.

4. A device for recording data to or reproducing data from an optical disk, comprising:

means for determining a condition of defect management applied to the data according to the type of data being recorded or reproduced, and, means for managing disk defects using said condition when data is recorded on or reproduced from said disk, further comprising:

means for recording data, in units of recording, on the disk, wherein said determining means determines the condition of defect management for each of said units of recording, wherein said recording means also records control information relating to the type of the data for each unit of recording, in association with said unit or recording.

* * * * *